United States Patent Office 3,161,681
Patented Dec. 15, 1964

3,161,681
CYCLOBUTANE DERIVATIVES CONTAINING AROMATIC AMINE OR IMINE GROUPS
James C. Martin, Kingsport, Tenn., assignor to Eastman Kodak Company, Rochester, N.Y., a corporation of New Jersey
No Drawing. Filed Nov. 25, 1960, Ser. No. 71,396
11 Claims. (Cl. 260—566)

The present invention relates to cyclobutane derivatives.
It is an object of this invention to provide a new class of cyclobutane derivatives containing aromatic amine groups.

It is another object of this invention to provide novel intermediates useful for preparing dyes.

It is still another object of this invention to provide novel cyclobutane derivatives that are useful in the preparation of polyesters.

It is likewise an object of this invention to provide novel compounds useful in preparing pharmaceuticals.

These and other objects of the invention will be apparent from the description and claims which follow.

The cyclobutane derivatives of the invention have the following structural formulas

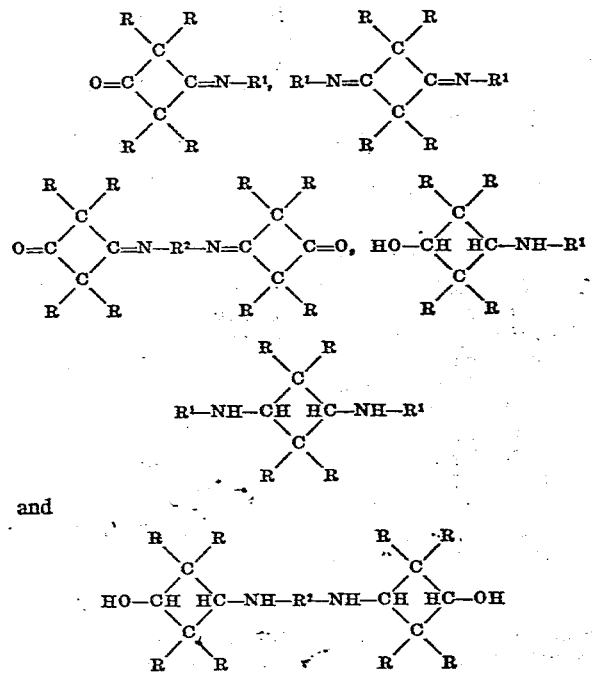

and

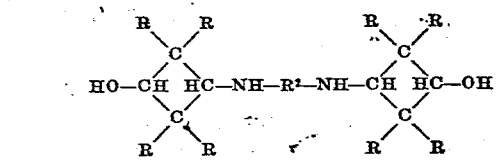

The substituent R in the above structural formulas is an alkyl radical having 1 to 8 carbon atoms and preferably 1 to 4 carbon atoms. Typical alkyl radicals for the substituent R, include methyl, ethyl, n-propyl, isopropyl, n-butyl, isobutyl, n-amyl, n-hexyl, n-heptyl, 2-ethylhexyl, n-octyl, etc. Mixtures of various alkyl substituents can comprise the compounds of the invention. The substituent $R^1$ in the above structural formulas is an aryl radical such as a phenyl radical. The substituent $R^2$ in the above structural formulas is an arylene radical joined to the nitrogen atoms at the para positions of the arylene radical such as the arylene radical having the structural formula

The novel cyclobutane derivatives of the invention are prepared from the corresponding 2,2,4,4-tetraalkyl-1,3-cyclobutane diones. Such diones are known compounds in the art. In preparing the present cyclobutane derivatives, such diones are reacted with aromatic primary amines in the presence of a catalytic amount of an acidic material such as p-toluenesulfonic acid, benzosulfonic acid, methionic acid, sulfuric acid, phosphoric acid, hydrochloric acid, trifluoroacetic acid, dichloroacetic acid, picric acid and the like. This reaction of the dione with the aromatic primary amine is preferably carried out at an elevated temperature generally in the range of 80° to 200° C. Although this reaction can be effected without a solvent, I prefer to utilize a solvent to remove the water formed in the reaction as an azeotrope with the solvent. Suitable solvents include aliphatic and aromatic hydrocarbons such as n-decane, benzene, toluene, xylene, cymene, etc.

The resulting reaction product can then be partially hydrogenated to produce other novel compounds of the invention. This hydrogenation is effected under conditions effective to hydrogenate all positions except the aromatic nuclei. Typical hydrogenation catalysts include copper chromite, Raney nickel, supported nickel, and supported platinum. In view of the differing nature of these catalysts the pressure and temperature employed to effect the desired partial hydrogenation varies with each catalyst material. Copper chromite requires temperatures from 150–200° C. and pressures of about 3500 p.s.i. to about 6000 p.s.i. With copper chromite there is less concern about hydrogenating the aromatic ring, but other catalysts will hydrogenate the aromatic ring if certain temperature limits are exceeded. For example, Raney nickel is desirably used at a temperature of 80–120° C. at a pressure of about 800 p.s.i. to 3000 p.s.i. Typical hydrogenation conditions for a catalyst such as 1% platinum on carbon are 100–600° C. at 1000 p.s.i. to 3000 p.s.i. In carrying out this hydrogenation reaction, I prefer to use a solvent and a wide variety of solvents can be utilized including alcohols, aromatic and aliphatic hydrocarbons, ethers, chlorinated hydrocarbons and the like.

The following general equations illustrate the preparation of the present novel cyclobutane derivatives from 2,2,4,4-tetraalkyl-1,3-cyclobutane diones.

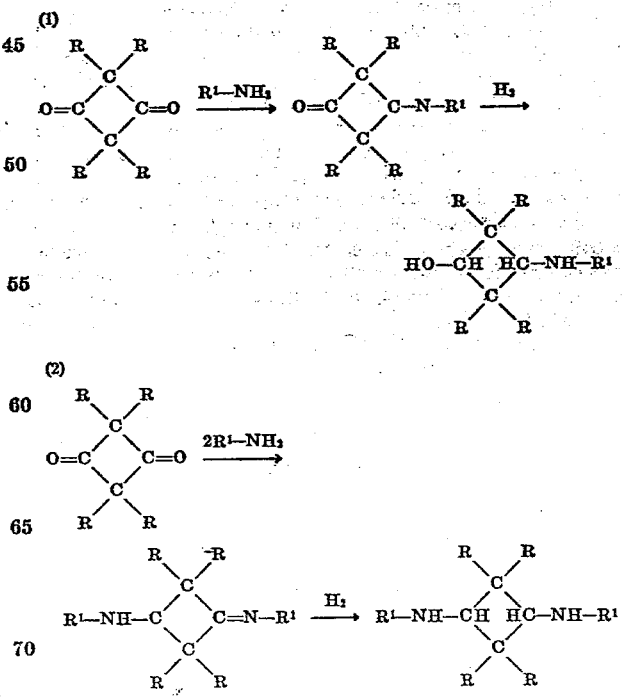

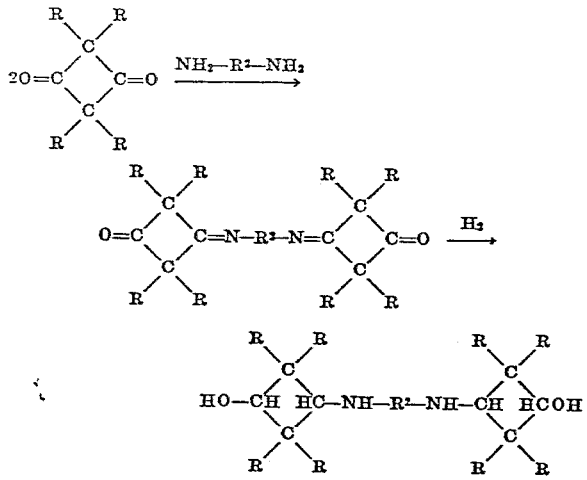

The invention is illustrated by the following examples of preferred embodiments thereof.

*Example 1*

A solution of 140 g. (1.0 mole) of 2,2,4,4-tetramethyl-1,3-cyclobutanedione, 232.5 g. (2.5 moles) of aniline, and 5 g. of p-toluenesulfonic acid in 700 ml. of toluene was refluxed for 8 hr. through a 10-in. packed column equipped with a Dean-Stark tube and a condenser. A total of 36 ml. (2 moles) of water had separated at the end of this period. The reaction solution was cooled, washed successively with sodium bicarbonate solution and water, and finally dried over anhydrous magnesium sulfate. This solution was filtered and evaporated to yield a slurry of crystals. The solid which was recovered from this material by filtration weighed 243.1 g. It was washed with cold hexane to give 221.3 g. of N,N'-diphenyl-2,2,4,4-tetramethyl-1,3-cyclobutanediimine, M.P. 137–140° C. An analytical sample was recrystallized twice from ethanol to give white crystals, M.P. 141–142° C.

*Analysis.*—Calc'd for $C_{20}H_{22}N_2$: C, 82.7; H, 7.6; N, 9.7. Found: C, 82.6; H, 7.4; N, 9.6.

*Example 2*

A solution of 280 g. (2.0 moles) of 2,2,4,4-tetramethyl-1,3-cyclobutanedione, 186 g. (2.0 moles) of aniline, and 3 g. of p-toluenesulfonic acid in 700 ml. of toluene was refluxed for 6 hr. through a 10-in. packed column equipped with a Dean-Stark tube and a condenser. A total of 36 ml. (2.0 moles) of water had separated at the end of this period. The reaction solution was cooled, washed successively with sodium bicarbonate solution and water, and finally dried over anhydrous magnesium sulfate. This solution was filtered and distilled through an 18-in. packed column to give some unreacted 2,2,4,4-tetramethyl-1,3-cyclobutanedione and 263 g. of 2,2,4,4-tetramethyl-3-phenyliminocyclobutanone, B.P. 124–125° C. (7 mm.), $n_D^{20}$ 1.5165.

*Analysis.*—Calc'd for $C_{14}H_{17}NO$: C, 78.1; H, 7.9; N, 6.5. Found: C, 77.8; H, 7.9; N, 6.4.

*Example 3*

A solution of 168 g. (1.0 mole) of 2,4-diethyl-2,4-dimethyl-1,3-cyclobutanedione, 93 g. (1.0 mole) of aniline, and 2 g. of p-toluenesulfonic acid was refluxed for 20 hr. through a 10-in. packed column equipped with a Dean-Stark tube and a condenser. A total of 18 ml. (1.0 mole) of water had separated at the end of this period. The reaction solution was worked up as described in Example 2 to give 202 g. of 2,4-diethyl-2,4-dimethyl-3-phenyliminocyclobutanone, B.P. 135° C. (6 mm.).

*Analysis.*—Calc'd for $C_{16}H_{21}NO$: C, 79.1; H, 8.6; N, 5.8. Found: C, 79.0; H, 8.6; N, 5.9.

*Example 4*

A solution of 108 g. (1.0 mole) of p-phenylenediamine, 280 g. (2.0 moles) of 2,2,4,4-tetramethyl-1,3-cyclobutanedione, and 2 g. of p-toluenesulfonic acid in 1200 ml. of toluene was refluxed for 24 hr. through a 12-in. Vigreux column equipped with a Dean-Stark tube and a condenser. A total of 34 ml. (1.9 moles) of water had separated at the end of this period. The reaction solution was cooled to room temperature and the solid that precipitated was removed by filtration. This solid was dried and washed successively with water, sodium bicarbonate solution and water, and dried in a 90° C. oven. The resulting solid, 3,3' - p - phenylene - dinitrilobis[2,2,4,4 - tetramethylcyclobutanone] weighed 256.5 g., M.P. 227–285° C. An analytical sample was recrystallized from methyl Cellosolve to give a light tan solid.

*Analysis.*—Calc'd for $C_{22}H_{28}N_2O_2$: C, 75.0; H, 8.0; N, 8.0. Found: C, 74.6; H, 7.9; N, 8.3.

*Example 5*

A solution of 70 g. (0.5 mole) of 2,2,4,4-tetramethyl-1,3-cyclobutanedione, 170 g. (1.03 moles) of ethyl-p-aminobenzoate and 1 g. of p-toluenesulfonic acid in 400 ml. of toluene was refluxed for 12 hrs. through a 10-in. packed column equipped with a Dean-Stark tube and a condenser. A total of 14.5 ml. (0.8 mole) of water had separated at the end of this period. The reaction solution was cooled to room temperature and the solid that precipitated was removed by filtration. A great deal of product that remained in solution was not recovered. This solid was dried and washed successively with water, sodium bicarbonate solution and water, and finally dried in a 100° C. oven. The resulting solid, N,N'-2,2,4,4-tetramethyl-1,3-cyclobutane-diylidenedinitrilodibenzoic acid, diethyl ester weighed 89 g. M.P. 176–177° C.

*Analysis.*—Calc'd for $C_{26}H_{30}N_2O_4$: C, 72.0; H, 6.9; N, 6.5. Found: C, 72.1; H, 6.9; N, 6.4.

*Example 6*

A solution of 100 g. (0.47 mole) of 2,2,4,4-tetramethyl-3-phenyliminocyclobutanone in 300 ml. of ethanol was hydrogenated in a high pressure, rocking autoclave over 15 g. of copper chromite catalyst at 175° C. and 5000 p.s.i. of hydrogen for 2 hr. The autoclave was cooled, vented, and the contents filtered to remove the catalyst. The filtrate was distilled through a 10-in. packed column to give 76.0 g. of 3-anilino-2,2,4,4-tetramethylcyclobutanol, B.P. 131–132° C. (1.5 mm.). This material solidified slowly on cooling.

*Analysis.*—Calc'd for $C_{14}H_{21}NO$: C, 76.7; H, 9.6; N, 6.4. Found: C, 76.7; H, 9.8; N, 6.4.

*Example 7*

A solution of 30 g. (0.103 mole) of N,N'-diphenyl-2,2,4,4-tetramethyl-1,3-cyclobutanediimine in 75 ml. of benzene was hydrogenated in a high pressure, rocking autoclave over 5 g. of Raney nickel catalyst at 100° C. and 1500 p.s.i. of hydrogen for 2 hr. The autoclave was cooled, vented, and the contents filtered to remove the catalyst. The filtrate was taken to dryness on the steam bath, leaving a viscous residue, which crystallized on scratching. This material weighed 30.0 g. and was crude N,N' - diphenyl - 2,2,4,4 - tetramethyl - 1,3 - cyclobutanediamine. This crude product was recrystallized from petroleum ether to give 11.0 g., M.P. 108–110° C. and then from ethanol to give 10.7 g., M.P. 109–111° C.

*Analysis.*—Calc'd for $C_{20}H_{26}N_2$: C, 81.6; H, 8.9; N, 9.5. Found: C, 81.4; H, 9.0; N, 9.5.

*Example 8*

A solution of 50 g. (0.14 mole) of 3,3'-p-phenylenedinitrilobis(2,2,4,4-tetramethylcyclobutanone) in 400 ml. of ethanol was hydrogenated in a high pressure, rocking autoclave over 20 g. of copper chromite catalyst at 175°

C. and 5000 p.s.i. of hydrogen for 3 hrs. After cooling, the reaction solution was filtered to remove the catalyst. The filtrate was evaporated on the steam bath to give 48.8 g. of 3,3'-p-phenylenediaminobis(2,2,4,4-tetramethylcyclobutanol) as a dark, viscous residue. This material was purified by distillation in a molecular still, B.P. 128–148° C. (<1μ).

*Example 9*

A solution of 121.5 g. (0.5 mole) of 2,4-diethyl-2,4-dimethyl-3-phenyliminocyclobutanone in 500 ml. of dioxane was hydrogenated in a high pressure, rocking autoclave over 10 g. of 1% platinum on carbon powder at 160° C. and 1500 p.s.i. of hydrogen for 4 hrs. The autoclave was cooled, vented, and the contents filtered to remove the catalyst. The filtrate was distilled through a 10-in. packed column to give 96.1 g. of 3-anilino-2,4-diethyl-2,4-dimethylcyclobutanol, B.P. 139–141° C. (1.4 mm.).

Examples 10 to 14 illustrate the utility of the subject novel compounds.

*Example 10*

To a solution of 1.39 g. (0.015 mole) of aniline in 15 ml. of water and 7 ml. of concentrated hydrochloric acid chilled to 0° C. was added a solution of 1.08 g. (0.015 mole) of sodium nitrite in 3 ml. of water. The reaction solution was stirred at 0–5° C. for 30 min. Excess nitrous acid was destroyed by adding sulfamic acid. To one-third of this solution was added a solution of 0.995 g. (0.005 mole) of 3-anilino-2,2,4,4-tetramethylcyclobutanol in dilute hydrochloric acid. The solution was buffered with ammonium acetate to a pH of 6.5 and allowed to stand for 2 hrs. The yellow solid that precipitated was isolated by filtration, washed thoroughly with water and air dried. There was obtained 0.7 g. of a bright yellow solid. This material imparted a brilliant yellow color to textile fibers of cellulose acetate, nylon and others.

*Example 11*

A mixture of 4.34 g. (0.01 mole) of N,N'-2,2,4,4-tetramethyl-1,3-cyclobutanediylidenedinitrilodibenzoic acid, diethyl ester, 1.58 g. (0.011 mole) of trans-1,4-cyclohexanedimethanol, and 1 drop of titanium isopropoxide in butanol (4.8% Ti) was placed in a small tube under nitrogen and heated at 220° C. for 40 min. and at 280° C. under vacuum for 50 min. The tube was cooled and the prepolymer was removed and crushed in a mortar, using acetone to promote crystallization. The resulting polymer had a melting point of 275–281° C. and an inherent viscosity, as measured in a solvent mixture of 60 parts phenol and 40 parts tetrachloroethane, of 0.36. A 0.5 g. sample of this polymer was heated at 260° C. under a 0.07 mm. vacuum for 90 min. The resulting light yellow polymer had a melting point of 283–290° C. and an inherent viscosity, as measured in the phenol-tetrachloroethane solvent described above, of 0.71. A film formed by heat pressing the resulting polymer was flexible and tough. Strong fibers can be pulled from a melt of the polymer.

*Example 12*

A solution of 6.9 g. (.05 mole) of p-nitroaniline in 18 ml. of 50% sulfuric acid was added to a mixture of 3.6 g. (.05 mole) of sodium nitrite, 8 ml. of water and 50 g. of ice. The mixture was stirred until solution was complete, then filtered. One-fifth of this solution was added to .01 mole of 2,2,4,4-tetramethyl-3-phenyliminocyclobutanone in 25 ml. of a 1:5 propionic-acetic acid mixture cooled in an ice bath. The mineral acid was neutralized with ammonium acetate to pH 6.5. After 2 hrs. of intermittent stirring, the solution was diluted with water to 800 ml. The resulting dye was isolated by filtration, washed with 100 ml. of water, and dried. The prepared dye imparted a brilliant orange color to textile fibers of cellulose acetate, nylon, and a polyester of terephthalic acid and 1,4-cyclohexanedimethanol. The prepared dye has the following structural formula:

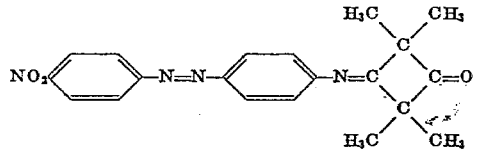

*Example 13*

A solution of 2.36 g. (.02 mole) of p-aminobenzonitrile in 20 ml. of a 1:5 propionic-acetic acid mixture was added to a cold solution of 1.44 g. (.02 mole) of sodium nitrite in 10 ml. of concentrated sulfuric acid. An additional 20 ml. of the propionic-acetic acid mixture was added and the solution stirred for 2½ hrs. One-fourth of this solution was added to a solution of 0.80 g. (.005 mole) of 2,2,4,4-tetramethyl-3-phenyliminocyclobutanone in 15 ml. of the propionic-acetic acid mixture. The mineral acid was neutralized with ammonium acetate. After 2 hrs. of intermittent stirring, the solution was diluted to 300 ml. with water. The resulting dye was isolated by filtration, washed with 100 ml. of water, and dried. This material imparted a brilliant yellow color to textile fibers of cellulose acetate and nylon. The prepared dye has the following structural formula:

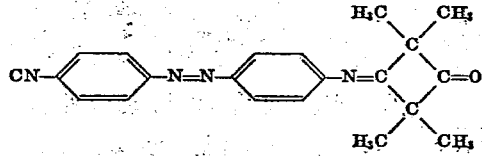

*Example 14*

To a solution of 1.39 g. (0.015 mole) of aniline in 15 ml. of water and 7 ml. of concentrated hydrochloric acid chilled to 0° C. was added a solution of 1.08 g. (0.015 mole) of sodium nitrite in 3 ml. of water. The reaction solution was stirred at 0–5° C. for 30 min. Excess nitrous acid was destroyed by adding sulfamic acid. Two-thirds of this solution was adjusted to a pH of 6.5 with ammonium acetate, and the resulting material was added to a cooled solution of .005 mole of N,N'-diphenyl-2,2,4,4-tetramethyl-1,3-cyclobutanediimine in 15 ml. of acetic acid. After 2 hr. of intermittent stirring, the reaction solution was diluted to 300 ml. by addition of water. The resulting dye was isolated by filtration, washed with 100 ml. of water, and dried. This material imparted a brilliant yellow color to textile fibers of cellulose acetate, nylon, and a polyester of terephthalic acid and 1,4-cyclohexanedimethanol. The prepared dye has the following structural formula:

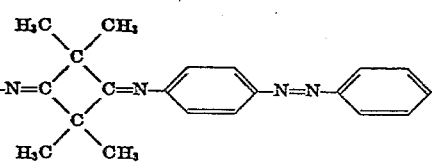

The present invention thus provides a novel and useful class of cyclobutane derivatives.

Although the invention has been described in detail with particular reference to certain typical embodiments thereof, it will be understood that variations and modifications can be effected within the spirit and scope of the invention as described hereinabove and as defined in the appended claims.

I claim:
1. A cyclobutane derivative having a formula selected from the group consisting of

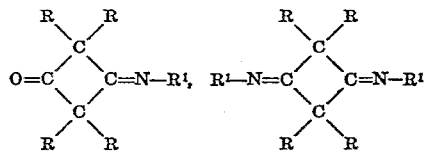

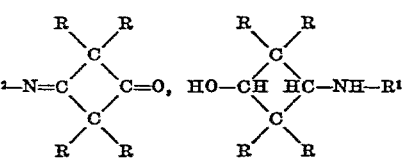

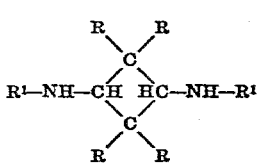

and

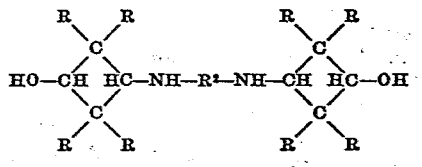

wherein R is an alkyl radical having 1 to 8 carbon atoms, $R^1$ is a mononuclear hydrocarbon aryl radical and $R^2$ is a mononuclear hydrocarbon arylene radical joined to the nitrogen atoms at the para positions of said arylene radical.

2. A cyclobutane derivative as defined by claim 1 wherein R is methyl.

3. A cyclobutane derivative having the structural formula

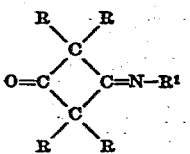

wherein R is an alkyl radical having 1 to 4 carbon atoms and $R^1$ is a phenyl radical.

4. A cyclobutane derivative having the structural formula

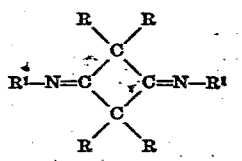

wherein R is an alkyl radical having 1 to 4 carbon atoms and $R^1$ is a phenyl radical.

5. A cyclobutane derivative having the structural formula

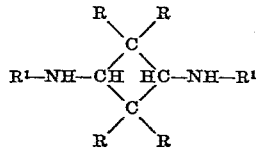

wherein R is an alkyl radical having 1 to 4 carbon atoms and $R^1$ is a phenyl radical.

6. A cyclobutane derivative having the structural formula

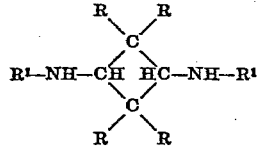

wherein R is an alkyl radical having 1 to 4 carbon atoms and $R^1$ is a phenyl radical.

7. A cyclobutane derivative having the structural formula

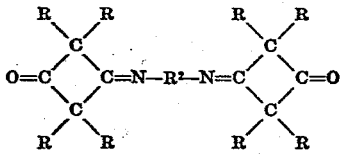

wherein R is an alkyl radical having 1 to 4 carbon atoms and $R^2$ is an arylene radical having the structure

8. N,N'-diphenyl-2,2,4,4 - tetramethyl - 1,3 - cyclobutanediimine.
9. 2,2,4,4-tetramethyl-3-phenylimino cyclobutanone.
10. 2,4 - diethyl - 2,4 - dimethyl-3-phenylimino cyclobutanone.
11. 3,3' - p-phenylenedinitrilobis[2,2,4,4 - tetramethylcyclobutanone].

References Cited in the file of this patent
UNITED STATES PATENTS

| | | |
|---|---|---|
| 2,715,636 | Carson | Aug. 16, 1955 |
| 2,837,568 | Zimmerman | June 3, 1958 |
| 2,849,487 | Brust | Aug. 26, 1958 |
| 2,933,522 | Cramer et al. | Apr. 19, 1960 |
| 3,042,710 | Dickstein et al. | July 3, 1962 |
| 3,072,724 | Elam et al. | Jan. 8, 1963 |

OTHER REFERENCES

Wedekind et al.: Ber. Deut. Chem., vol. 43, pages 834–836 (1910).

Crossley et al.: J. Chem. Soc (London), vol. of 1911, pages 1101–1112.

Schwarzenbach et al.: Hel. Chim. Acta., vol. 33, pages 1139–1146 (1940).

Granger et al.: Bull. Soc. Chim. France, vol. of 1949, pages 850–853.